(12) United States Patent
Lee

(10) Patent No.: US 7,365,365 B2
(45) Date of Patent: Apr. 29, 2008

(54) THIN FILM TRANSISTOR SUBSTRATE OF A HORIZONTAL ELECTRIC FIELD TYPE

(75) Inventor: Jae Bong Lee, Busan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 29 days.

(21) Appl. No.: 11/521,297

(22) Filed: Sep. 15, 2006

(65) Prior Publication Data

US 2007/0018188 A1    Jan. 25, 2007

Related U.S. Application Data

(62) Division of application No. 11/023,620, filed on Dec. 29, 2004, now Pat. No. 7,129,106.

(30) Foreign Application Priority Data

Dec. 30, 2003   (KR) .................. 10-2003-0099809

(51) Int. Cl.
*H01L 27/15* (2006.01)
(52) U.S. Cl. ...................................... 257/83
(58) Field of Classification Search ................ 257/223, 257/227, 291, 292, 439, 443, 655, E27.1, 257/E27.125, E27.112, E29.117, E29.145, 257/E29.147, E29.151, E29.182, E29.202, 257/E29.273–E29.299, E29.314, E29.32, 257/E23.016
See application file for complete search history.

(56) References Cited

U.S. PATENT DOCUMENTS 5,598,285 A    1/1997  Kondo et al.
5,625,199 A *  4/1997  Baumbach et al. ............ 257/40
5,719,591 A *  2/1998  Callahan et al. .............. 345/98
5,726,676 A *  3/1998  Callahan et al. .............. 345/98
5,731,216 A *  3/1998  Holmberg et al. ............ 438/30
5,838,037 A    11/1998 Masutani et al.
5,946,060 A    8/1999  Nishiki et al.
5,990,987 A    11/1999 Tanaka
6,028,653 A    2/2000  Nishida
6,097,454 A    8/2000  Zhang et al.
6,160,270 A *  12/2000 Holmberg et al. ............ 257/59
6,266,166 B1   7/2001  Katsumata et al.
6,288,763 B1   9/2001  Hirota
6,297,866 B1   10/2001 Seo et al.

FOREIGN PATENT DOCUMENTS

JP    2001-154636 A    6/2001

* cited by examiner

*Primary Examiner*—Mary Wilczewski
*Assistant Examiner*—Swapneel Chhaya
(74) *Attorney, Agent, or Firm*—McKenna Long & Aldridge LLP

(57) ABSTRACT

A method of darkening a defective pixel including a short between a source electrode and a drain electrode in a thin film transistor substrate includes forming a gate line and a data line on a substrate to define a pixel region; forming a thin film transistor at a crossing of the gate line and the data line, the thin film transistor having a gate electrode, a source electrode and a drain electrode; forming a pixel electrode and a common electrode in the pixel region; forming a common line provided in parallel to the gate line and connected to the common electrode; forming an extended part of the drain electrode in parallel to the gate line; and cutting the extended part along a cutting line.

4 Claims, 4 Drawing Sheets

US 7,365,365 B2

THIN FILM TRANSISTOR SUBSTRATE OF A HORIZONTAL ELECTRIC FIELD TYPE

This application is a divisional of application Ser. No. 11/023,620, filed Dec. 29, 2004, now U.S. Pat. No. 7,129,106, which claims priority to Korean Patent Application No. 10-2003-0099809, filed Dec. 30, 2003, each of which are incorporated by reference for all purposes as if fully set forth herein.

This application claims the benefit of Korean Patent Application No. 2003-0099809 filed in Korea on Dec. 30, 2003, which is hereby incorporated by reference.

BACKGROUND OF THE INVENTION

1. Field of the Invention

The present invention relates to a thin film transistor substrate for a liquid crystal display panel, and more particularly to a thin film transistor substrate of horizontal electric field type and a method of darkening a defective pixel in the same.

2. Description of the Related Art

Generally, a liquid crystal display (LCD) device controls the light transmittance of a liquid crystal material by applying an electric field to thereby display a picture. Liquid crystal displays are largely classified into vertical electric field type and horizontal electric field type, depending upon the direction of the applied electric field.

A liquid crystal display of a vertical electric field type drives a liquid crystal in a twisted nematic (TN) mode by applying a vertical electric field to the liquid crystal material. The vertical electric field is formed between a pixel electrode and a common electrode arranged opposite to each other on an upper substrate and lower substrate, respectively. The liquid crystal display of the vertical electric field type provides a large aperture ratio, but has a narrow viewing angle of about 90°.

The liquid crystal display of the horizontal electric field type drives a liquid crystal in an in plane switching (IPS) mode by applying a horizontal electric field to the liquid crystal material. The horizontal electric field is formed between the pixel electrode and the common electrode arranged in parallel to each other on a lower substrate. The liquid crystal display of the horizontal electric field type provides a wide viewing angle of about 160°. More specifically, the liquid crystal display of the horizontal electric field type includes a thin film transistor substrate (i.e., lower substrate) and a color filter array substrate (i.e., upper substrate). The thin film transistor substrate and the color filter array substrate are joined opposite to each other. A spacer is provided to maintain a uniform cell gap between two substrates. The cell gap is filled with a liquid crystal material.

The thin film transistor substrate is comprised of a plurality of signal wires for forming a horizontal electric field for each pixel, a plurality of thin film transistors, and an alignment film coated thereon to align the liquid crystal. The color filter array substrate includes a color filter for color generation, a black matrix for preventing light leakage, and an alignment film coated thereon to align the liquid crystal material.

FIG. 1 is a plan view showing a structure of a related art thin film transistor substrate of a horizontal electric field type. Referring to FIG. 1, the thin film transistor substrate of the horizontal electric field type includes a gate line 2 and a data line 4. A gate signal is applied to the gate line 2 and a data signal is applied to the data line 4. A gate insulating film (not shown) is provided between the gate line 2 and the data line 4.

A thin film transistor 6 is provided at a crossing of the gate line 2 and the data line 4. A pixel region is defined by the crossing of the gate line 2 and the data line 4. A pixel electrode 18 and a common electrode 20 are provided in the pixel area for forming a horizontal electric field. A common line 16 is connected to the common electrode 20. The common line 16 supplies a reference voltage for driving the liquid crystal. The common line 16 is provided in parallel to the gate line 2 with the pixel area therebetween. The common line 16 is adjacent to a next-stage gate line 2.

The thin film transistor 6 allows a pixel signal of the data line 4 to be charged and maintained on the pixel electrode 18 in response to the gate signal from the gate line 2. To this end, the thin film transistor 6 includes a gate electrode 8, a source electrode 10, a drain electrode 12, and an active layer 14. The gate electrode 8 is connected to the gate line 2. The source electrode 10 is connected to the data line 4. The drain electrode 12 is connected to the pixel electrode 18 in opposition to the source electrode 10. The drain electrode 12 further includes an extended part 12A, which extends in parallel to the gate line 2. The extended part 12A of the drain electrode 12 is provided in opposition to a horizontal part 20B of the common electrode 20 with the gate insulating film (not shown) therebetween to form a first storage capacitor.

An active layer 14 overlaps the gate electrode 8 including the gate insulating film (not shown) therebetween to define a channel between the source electrode 10 and the drain electrode 12. The active layer 14 also overlaps the data line 4. On the active layer 14, an ohmic contact layer (not shown) is provided to establish an ohmic contact with the data line 4, the source electrode 10 and the drain electrode 12.

The pixel electrode 18, which is provided in the pixel area, is connected to the drain electrode 12 of the thin film transistor 6 via a first contact hole 24 through a protective film (not shown). The pixel electrode 18 includes a first horizontal part 18A overlapping the extended part 12A of the drain electrode 12, and a finger part 18B extended from the first horizontal part 18A into the pixel area. The pixel electrode 18 further includes a second horizontal part 18C commonly connected to the finger part 18B thereof and overlapping the common line 16 in order to form a second storage capacitor.

An upper storage electrode 22 is further provided between the common line 16 and the second horizontal part 18C of the pixel electrode 18 to increase a capacitance of the second storage capacitor. The upper storage electrode 22 overlaps the common line 16 having the gate insulating film (not shown) therebetween while overlapping the second horizontal part 18C of the pixel electrode 18 including the protective film (not shown) therebetween. The upper storage electrode 22 is connected to the second horizontal part 18C of the pixel electrode 18 via a second contact hole 26 through the protective film.

The common electrode 20 is connected to the common line 16 and is provided in the pixel area to form a horizontal electric field along the pixel electrode 18. To this end, the common electrode 20 includes a finger part 20A provided in parallel to the finger part 18C of the pixel electrode 18. Tthe common electrode 20 further includes a horizontal part 20B that is commonly connected to the finger part 20A thereof and overlaps the extended part 12A of the drain electrode 12 including the gate insulating film therebetween.

In related art the thin film transistor substrate of horizontal electric field type, the source electrode 10 and the drain electrode 12 are formed through the same mask process for patterning a source/drain metal layer along with the data line 4 and the upper storage electrode 22. In this case, when a distance between the source electrode 10 and the drain electrode 12 is relatively small, patterns are malformed causing shorts between the source electrode 10 and the drain electrode 12 like the A portion.

SUMMARY OF THE INVENTION

Accordingly, the present invention is directed to a thin film transistor substrate of horizontal electric field type and a method of darkening a defective pixel in the same, that substantially obviates one or more of problems due to limitations and disadvantages of the related art.

An object of the present invention to provide a thin film transistor substrate of horizontal electric field type and a method of darkening a defective pixel in the same without introducing other defects.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a method of darkening a defective pixel including a short between a source electrode and a drain electrode in a thin film transistor substrate includes forming a gate line and a data line on a substrate to define a pixel region; forming a thin film transistor at a crossing of the gate line and the data line, the thin film transistor having a gate electrode, a source electrode and a drain electrode; forming a pixel electrode and a common electrode in the pixel region; forming a common line provided in parallel to the gate line and connected to the common electrode; forming an extended part of the drain electrode in parallel to the gate line; and cutting the extended part along a cutting line.

In another aspect, a thin film transistor substrate for a liquid crystal display panel includes a gate line and a data line on a substrate to define a pixel region; a thin film transistor at a crossing of the gate line and the data line, the thin film transistor having a gate electrode, a source electrode and a drain electrode; a pixel electrode and a common electrode in the pixel region; a common line provided in parallel to the gate line and connected to the common electrode; an extended part of the drain electrode parallel to the gate line and cut along a cutting line, wherein the cutting line includes a first oblique portion originating at a start point, a second portion through the extended part of the drain electrode in a direction substantially parallel to the gate line, and a third oblique portion terminating at an end point.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Hereinafter, the preferred embodiments of the present invention will be described in detail with reference to FIGS. 2 to 4.

Figure 1:
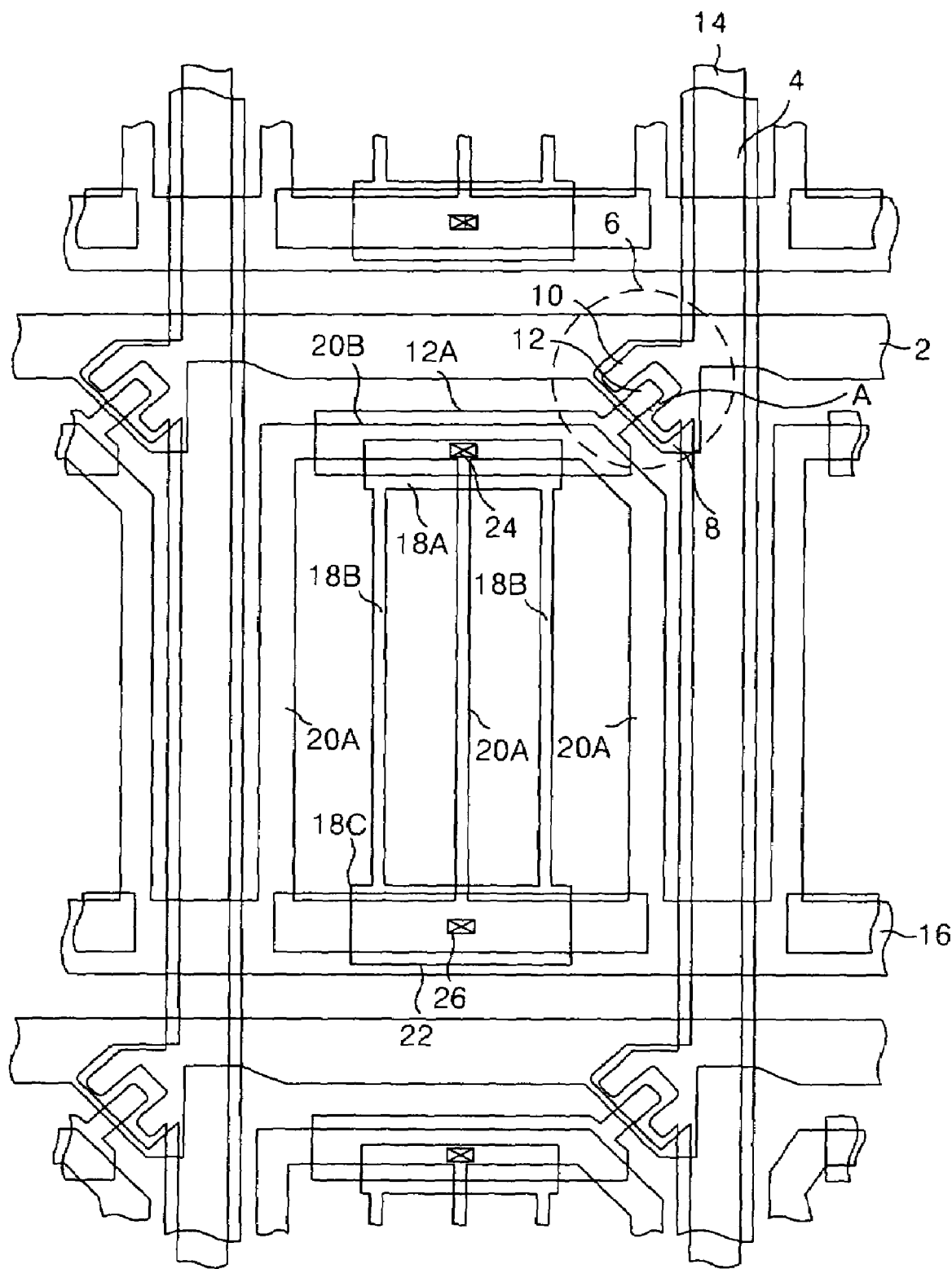
FIG. 1 is a plan view showing a structure of a related art thin film transistor substrate of a horizontal electric field type.
Figure 2:
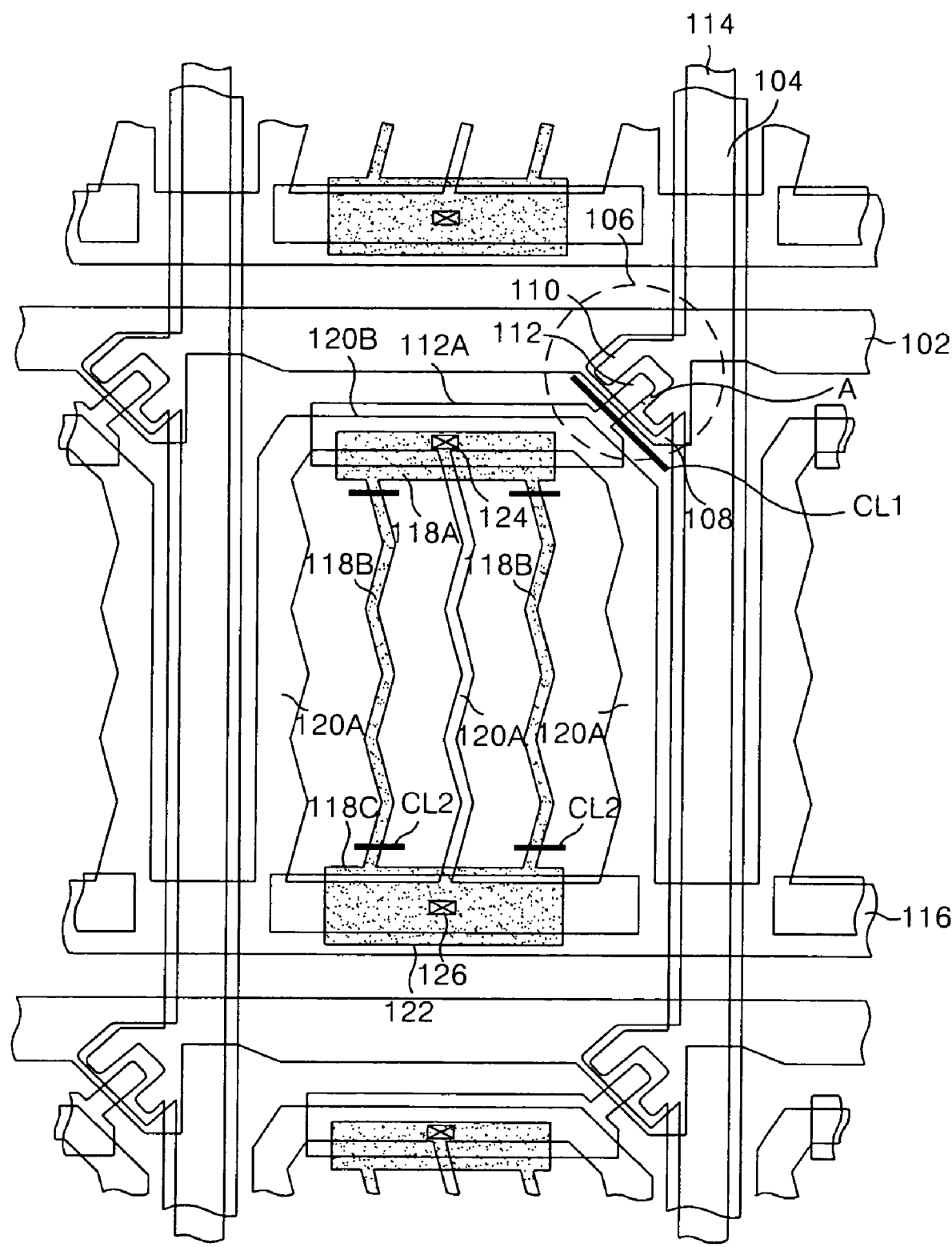
FIG. 2 is an explanatory plan view of an exemplary method of darkening a defective pixel in a thin film transistor substrate of a horizontal electric field type according to an embodiment of the present invention.

FIG. 2 is an explanatory plan view of an exemplary method of darkening a defective pixel in a thin film transistor substrate of a horizontal electric field type according to an embodiment of the present invention. Referring to FIG. 2, the thin film transistor substrate of the horizontal electric field type includes a gate line 102 and a data line 104 crossing but insulated from each other. A crossing of the gate line 102 and the data line 104 defines a pixel area. A thin film transistor 106 is provided at a crossing of the gate line 102 and the data line 104. A pixel electrode 118 and a common electrode 120 are provided in a pixel area defined by the crossing of the gate line 102 and the data line 104 to form a horizontal electric field. The gate line 102 supplies a gate signal and the data line 104 supplies a data signal.

A common line 116 is connected to the common electrode 120. The common line 116 supplies a reference voltage for driving the liquid crystal and is provided in parallel to the gate line 102 with the pixel area therebetween. The common line 116 is adjacent to the next-stage gate line 102.

The thin film transistor 106 allows a pixel signal of the data line 104 to be charged and maintained on the pixel electrode 118 in response to a gate signal from the gate line 102. To this end, the thin film transistor 106 includes a gate electrode 108, a source electrode 110, a drain electrode 112, and an active layer 114. The gate electrode 108 is connected to the gate line 102. The source electrode 110 is connected to the data line 104. The drain electrode 112 is connected to the pixel electrode 118 in opposition to the source electrode 110.

The active layer 114 overlaps the gate electrode 108 with the gate insulating film (not shown) therebetween to define a channel between the source electrode 110 and the drain electrode 112. The active layer 114 also overlaps the data line 104. An ohmic contact layer (not shown) is provided on the active layer 114 to establish an ohmic contact with the data line 104, the source electrode 110 and the drain electrode 112.

The source electrode 110 is opposed to the drain electrode 112 to enclose the drain electrode 112, thereby defining a channel. In an embodiment of the present invention, the source electrode 110 forms a U-shaped channel or a channel of another shape along with the drain electrode 112 as shown in FIG. 2. The drain electrode 112 further includes an extended part 112A, which extends in parallel to the gate line 102. The extended part 112A of the drain electrode 112 is provided in opposition to a horizontal part 120B of the common electrode 120 with the gate insulating film (not shown) therebetween to form a first storage capacitor.

The pixel electrode 118 is connected to the drain electrode 112 of the thin film transistor 106 via a first contact hole 124 through a protective film (not shown). The pixel electrode 118 is provided in the pixel area. More specifically, the pixel electrode 118 includes a first horizontal part 118A overlapping the extended part 112A of the drain electrode 112, and a finger part 118B extended, in a zigzag shape, from the first horizontal part 118A into the pixel area. The pixel electrode 118 further includes a second horizontal part 118C commonly connected to the finger part 118B thereof and overlapping the common line 116 to form a second storage capacitor.

An upper storage electrode 122 is further provided between the common line 116 and the second horizontal part 118C of the pixel electrode 118 to increase a capacitance of the second storage capacitor. The upper storage electrode 122 overlaps the common line 116 with the gate insulating film (not shown) therebetween while overlapping the second horizontal part 118C of the pixel electrode 118 with the protective film (not shown) therebetween. The upper storage electrode 122 is connected to the second horizontal part 118C of the pixel electrode 118 via a second contact hole 126 through the protective film.

The common electrode 120 is connected to the common line 116 and is provided in the pixel area to form a horizontal electric field for a multi-domain along the pixel electrode 118. To this end, the common electrode 120 includes a finger part 120A in a zigzag shape along the finger part 118B of the pixel electrode 118. Herein, the finger part 120A of the common electrode 120 includes one side having a zigzag shape along the finger part 118B of the pixel electrode 118, and other side having a linear shape along the data line 104. Further, the common electrode 120 includes a horizontal part 120B commonly connected to the finger part 20A thereof and overlapping the extended part 112A of the drain electrode 112 with the gate insulating film therebetween to form the first storage capacitor.

In this case, when a short occurs between the source electrode 110 and the drain electrode 112 as indicated by the A portion due to a malformed pattern, the corresponding pixel is repaired by darkening it. For instance, the drain electrode 112 between the gate electrode 108 and the horizontal part 120B of the common electrode 120 is cut along a cutting line CL1 by a laser as shown in FIG. 2, thereby darkening a defective pixel. However, other shorts may be caused between the gate electrode 108 and the source electrode 110, or between the gate electrode 108 and the data line 104, at a start point or an end point of the laser due to lack of a sufficient margin for cutting the drain electrode 112 between the gate electrode 108 and the horizontal part 120B of the common electrode 120. This is because a cutting margin of an area corresponding to the start point and the end point of the cutting line CL1 is insufficient in spite of strong output emitted by the laser from the start point to the end point. To prevent this problem, the finger part 118B of the pixel electrode 118 is cut along a second cutting line CL2 as shown in FIG. 2 to eliminate a potential difference between the pixel electrode 118 and the common electrode 120, thereby repairing it. However, when the pixel electrode 118 is cut, a defective pixel appears as a bright point instead of a dark point.

Figure 3:
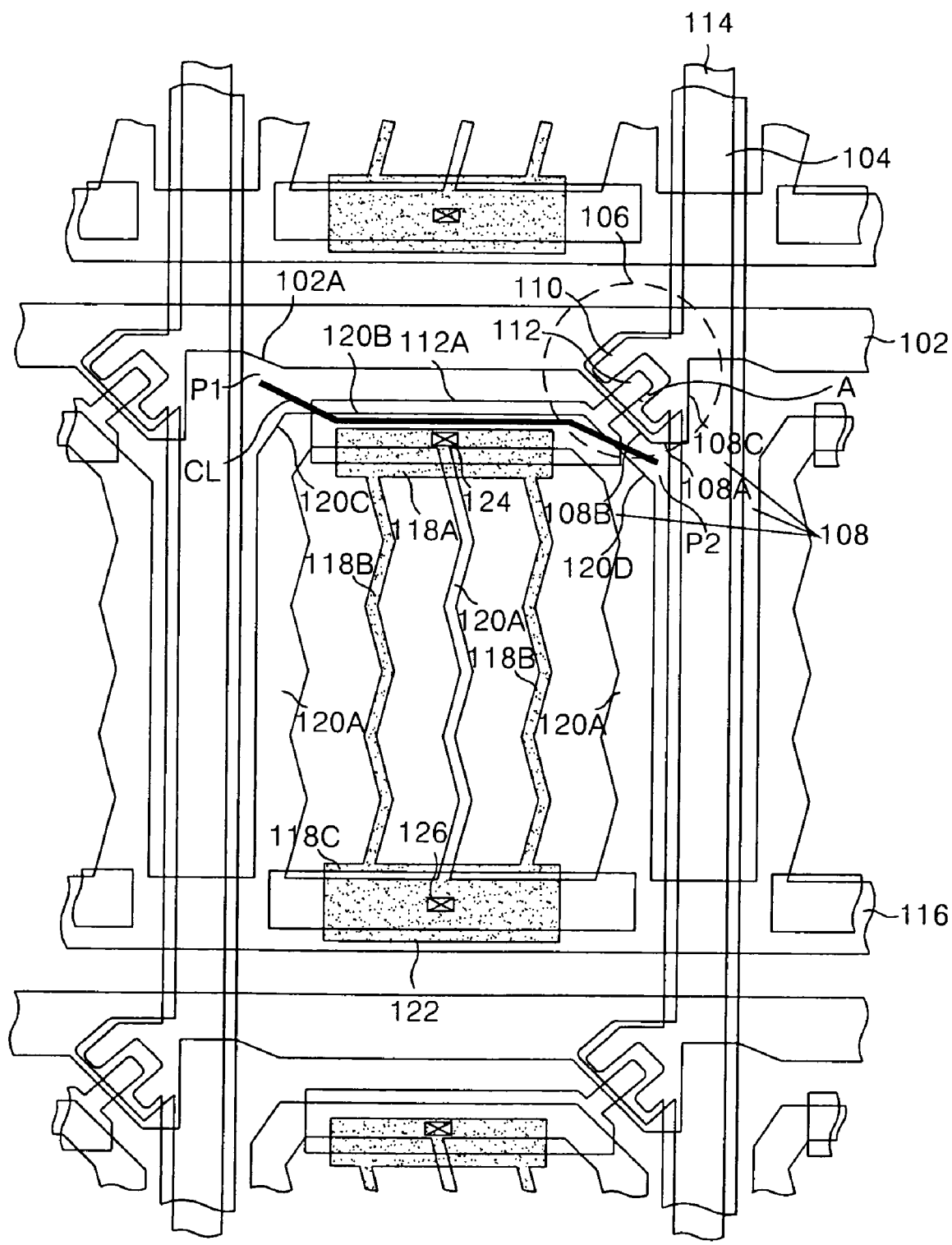
FIG. 3 is an explanatory plan view of an exemplary method of darkening a defective pixel in a thin film transistor substrate of a horizontal electric field type according to another embodiment of the present invention.

FIG. 3 is an explanatory plan view of an exemplary method of darkening a defective pixel in a thin film transistor substrate of a horizontal electric field type according to another embodiment of the present invention. Referring to FIG. 3, the extended part 112A of the drain electrode 112 overlapping the horizontal part 120B of the common electrode 120 is cut along a cutting line CL by the laser, thereby darkening the corresponding pixel. In this case, the extended part 112A of the drain electrode 112 can be cut without affecting an adjacent pattern using a laser having a strong output from the start point to the end point, because the cutting margins near the start point and the end point of the cutting line CL are relatively large.

More specifically, the start point (or the end point) of the cutting line CL having a strong laser output light leads to a first space P1 positioned between an inclined side 102A of the gate line 102 and a first inclined side 120C at a first corner area of the common electrode 120 opposed thereto. A sufficient cutting margin is formed in the first space P1 by narrowing the vertical with of the gate line 102 along the inclined side 102A thereof in an area adjacent to the data line 104. The narrowing of the gate line 102 forms a relatively large separation with respect to the first inclined side 120C of the common electrode 120.

The end point (or the start point) of the cutting line CL leads to a second space P2 between the horizontal side 108A of the gate electrode 108 and a second inclined side 120D at a second corner area of the common electrode 120 opposed thereto. Herein, the horizontal side 108A of the gate electrode 108 is directed to a side between an inclined side 108B and a vertical side 108C extended from the gate line 102. A sufficient cutting margin is formed in the second space P2 by forming a large separation between the horizontal side 108A of the gate electrode 108 and the second inclined side 120D of the common electrode 120 opposed thereto. Accordingly, the path of the laser along the cutting line CL begins at the first space P1, passes through the extended part 112A of the drain electrode 112, and ends at the second space P2. As a result, the laser having a strong output light at the start point and at the end point can cut the extended part 112A of the drain electrode 112 without affecting other patterns, thereby darkening the defective pixel.

Figure 4:
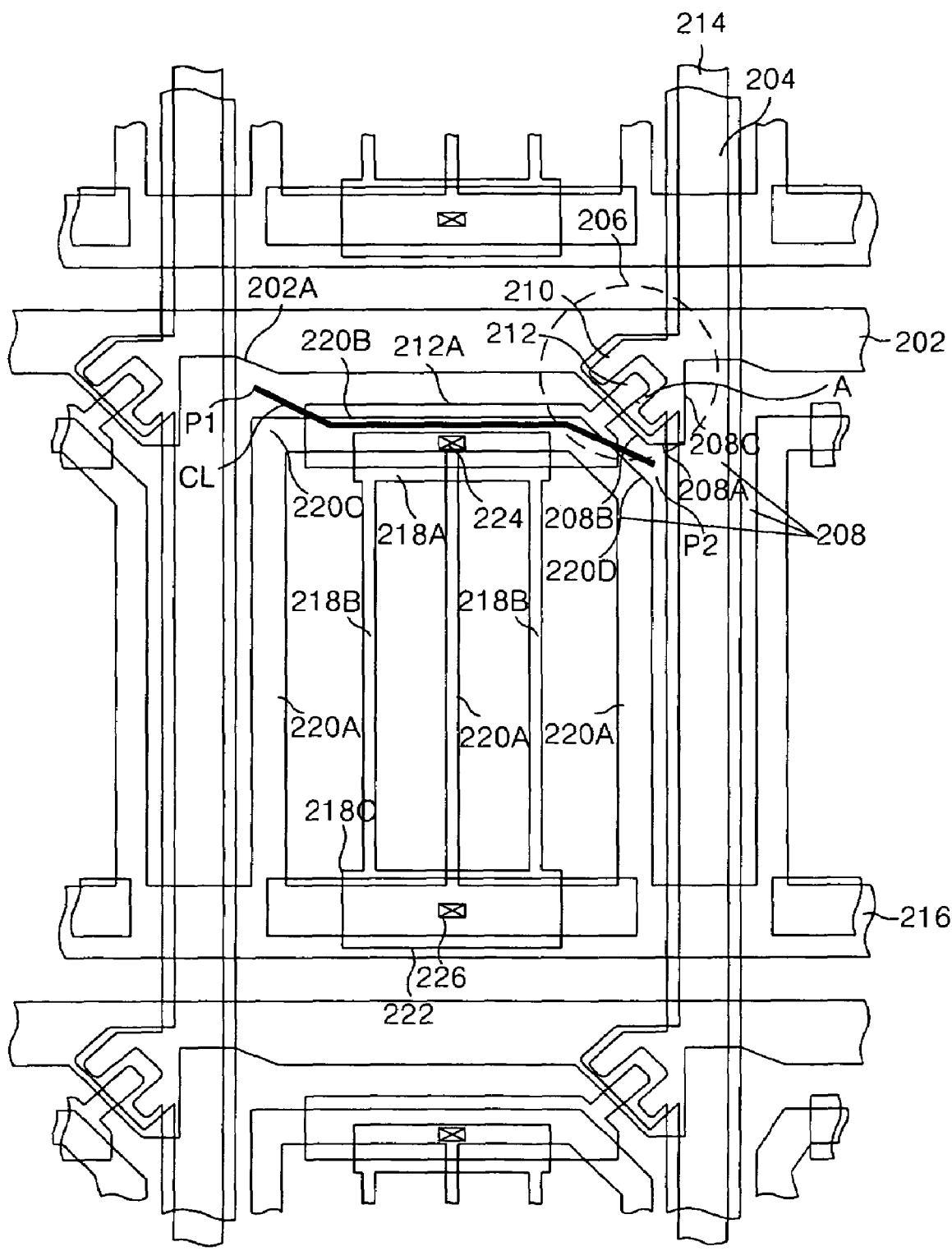
FIG. 4 is an explanatory plan view of an exemplary method of darkening a defective pixel in a thin film transistor substrate of a horizontal electric field type according to another embodiment of the present invention.

FIG. 4 is an explanatory plan view of an exemplary method of darkening a defective pixel in a thin film transistor substrate of a horizontal electric field type according to another embodiment of the present invention. The thin film transistor substrate shown in FIG. 4 has a structure similar to the thin film transistor substrate shown in FIG. 3. Thus a description of similar elements will be omitted.

Referring to FIG. 4, a finger part 218B of a pixel electrode 218 is provided in parallel to a finger part 220A of a common electrode 220 to form the same horizontal electric field. In the thin film transistor substrate shown in FIG. 4, a short A occurs between a source electrode 210 and a drain electrode 212. An extended part 212A of the drain electrode 212 overlapping a horizontal part 220B of the common electrode 220 is cut along a cutting line CL by a laser, thereby darkening the corresponding pixel. In this case, the extended part 212A of the drain electrode 212 can be cut using a laser with a strong output at a start point and at an end point without affecting an adjacent pattern because a cutting margin is relatively large near the start point and the end point of the cutting line CL.

More specifically, the start point (or the end point) of the cutting line CL with a strong laser output light leads to a first space P1 positioned between an inclined side 202A of the gate line 202 and a first corner area 220C of the common electrode 220 opposed thereto. A sufficient cutting margin is formed at the first space P1 by narrowing a vertical width of the gate line 202 along the inclined side 202A thereof near the data line 204. The narrowing of the vertical width of the gate line 202 forms a relatively large separation with respect to the common electrode 220.

The end point (or the start point) of the cutting line CL leads to a second space P2 between the horizontal side 208A of the gate electrode 208 and a second inclined side 220D at a second corner area of the common electrode 220 opposed thereto. Herein, the horizontal side 208A of the gate electrode 208 is directed to a side between an inclined side 208B and a vertical side 208C extended from the gate line 202. A sufficient cutting margin is provided in the second space P2 by forming a large separation between the horizontal side 208A of the gate electrode 208 and the second inclined side 220D of the common electrode 220 opposed thereto. Accordingly, the path of the laser along cutting line CL starts from the first space P1, passes through the extended part 212A of the drain electrode 212, and ends at the second space P2. As a result, the laser with a strong output at the start point and at the end point can cut the extended part 212A of the drain electrode 212 without affecting adjacent patterns, thereby darkening the defective pixel.

In accordance with the above-described embodiments of the present invention, a sufficient cutting margin is provided for darkening a defective pixel by providing a cutting line cutting line including a start point, which is located in a first space between the inclined side of the gate line and the second inclined side of the common electrode opposed thereto, and an end point, which is located in a second space between the horizontal part of the gate electrode and the second inclined side of the common electrode opposed thereto. The cutting line passes through an extended part of the drain electrode. Accordingly, it becomes possible to avoid affecting an adjacent pattern when darkening a defective pixel by cutting the drain electrode using a laser having a strong output at the start point and at the end point.

It will be apparent to those skilled in the art that various modifications and variations can be made in the method of darkening a defective pixel in thin film transistor substrate of horizontal electric field type of the present invention without departing from the spirit or scope of the invention. Thus, it is intended that the present invention cover the modifications and variations of this invention provided they come within the scope of the appended claims and their equivalents.

What is claimed is:

1. A thin film transistor substrate for a liquid crystal display panel including a darkened pixel with a short between a source electrode and a drain electrode, comprising:
    a gate line and a data line on a substrate to define a pixel region;
    a thin film transistor at a crossing of the gate line and the data line, the thin film transistor having a gate electrode, a source electrode and a drain electrode;
    a pixel electrode and a common electrode in the pixel region;
    a common line provided in parallel to the gate line and connected to the common electrode;
    an extended part of the drain electrode parallel to the gate line and cut along a cutting line,
    wherein the cutting line includes a first oblique portion originating at a start point, a second portion through the extended part of the drain electrode in a direction substantially parallel to the gate line, and a third oblique portion terminating at an end point.

2. The thin film transistor substrate of claim 1, wherein the start point is positioned between an inclined side of the gate line and a first corner area of the common electrode opposed thereto.

3. The thin film transistor substrate of claim 2, wherein the end point is positioned between a horizontal side of the gate electrode and a second inclined side at a second corner area of the common electrode opposed thereto, the horizontal side of the gate electrode being located the second inclined side and a vertical side of the gate electrode extended from the gate line.

4. The thin film transistor substrate of claim 2, wherein the gate line has a narrowed vertical width along the inclined side thereof near the data line.

* * * * *